Aug. 4, 1942.　　　　L. E. MEAGHER　　　　2,292,143
WASHING MACHINE
Filed May 6, 1940　　　2 Sheets-Sheet 2
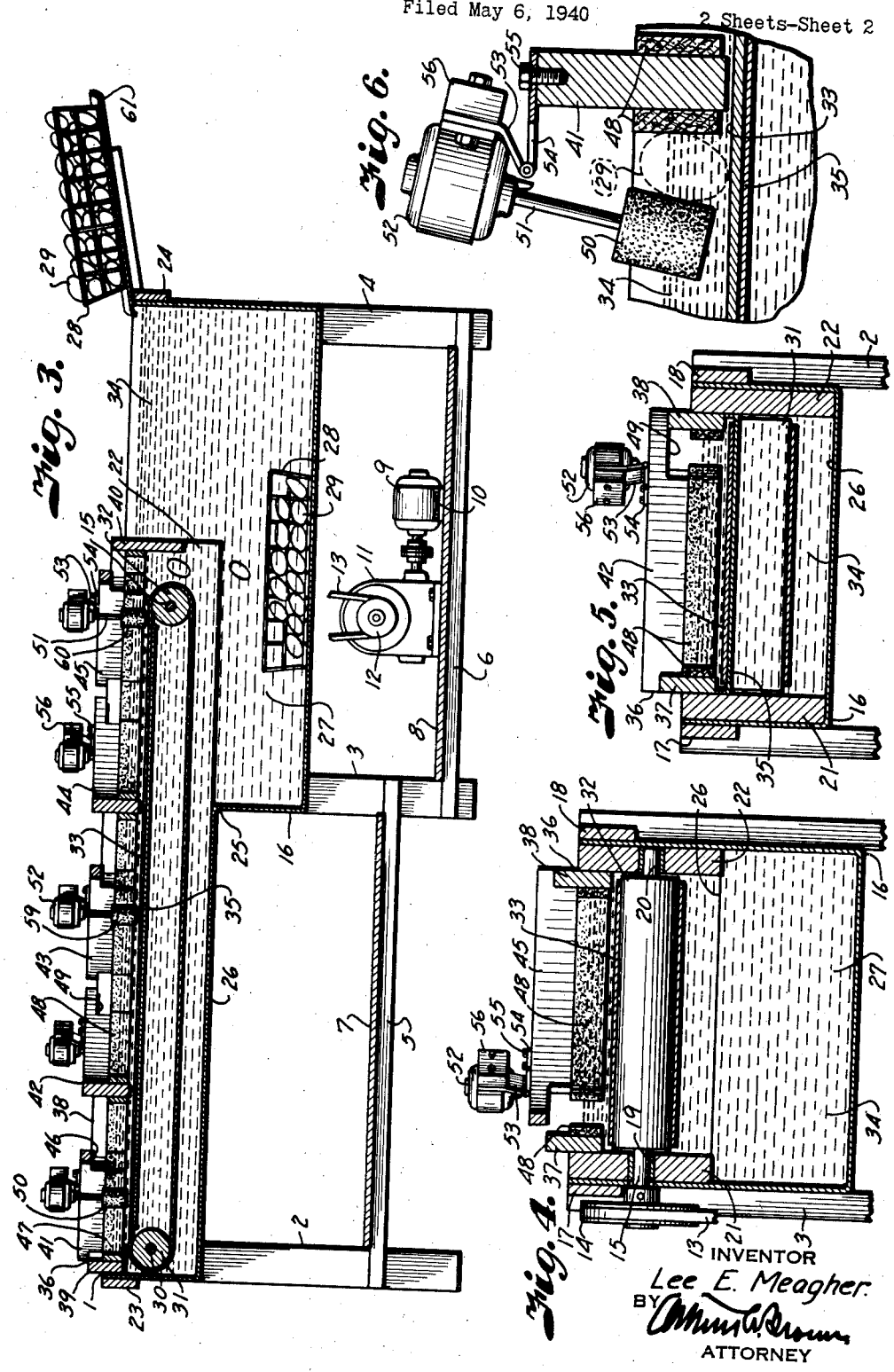
INVENTOR
Lee E. Meagher.
BY
ATTORNEY Patented Aug. 4, 1942

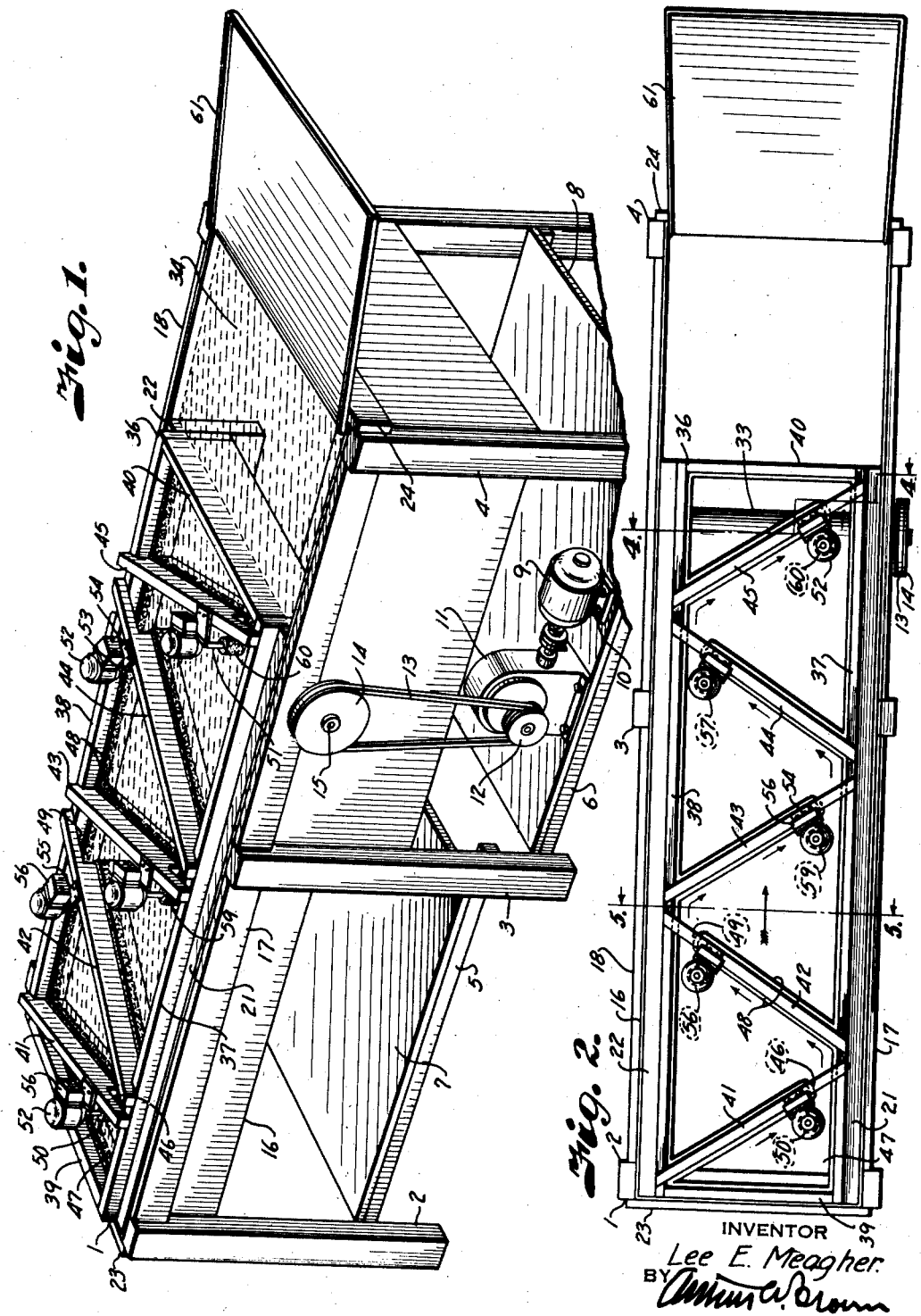

2,292,143

UNITED STATES PATENT OFFICE 2,292,143

WASHING MACHINE

Lee E. Meagher, Stanberry, Mo.

Application May 6, 1940, Serial No. 333,565

5 Claims. (Cl. 146—198)

This invention relates to washing machines and more particularly to a machine for washing eggs and like objects, the principal objects of the present invention being to provide a convenient, relatively economical and highly efficient egg washing machine.

Other objects of the present invention are to materially increase the number of eggs that may be washed in a given unit of time; to materially decrease egg breakage losses in washing operations; to more thoroughly clean eggs; to provide for enhancing the sale value of dirty eggs; to enhance the keeping qualities of eggs; to utilize the buoyancy of eggs in a fluid washing medium in obviating breakage; and to provide improved elements, together with arrangements of them, in an egg washing machine of the character and for the purposes noted.

In accomplishing these and other objects of the present invention, I have provided improved details of structure, the preferred form of which is illustrated in the accompanying drawings, wherein:

Fig. 1 is a perspective view of an egg washing machine embodying the features of the present invention.

Fig. 2 is a plan view of the machine illustrated in Fig. 1.

Fig. 3 is a longitudinal vertical sectional view through my improved egg washing machine, showing the arrangement for collecting and drying washed eggs.

Fig. 4 is a transverse vertical sectional view through the machine, substantially on the line 4—4, of Fig. 2.

Fig. 5 is a section similar to Fig. 4, substantially on the line 5—5, Fig. 2.

Fig. 6 is a detail side elevational view of an egg brush showing its relation to a padded guide rail, the rail and egg floor support being shown in vertical section.

Referring more in detail to the drawings:

1 designates an egg washing machine embodying the features of the present invention and which preferably includes a frame consisting of pairs of spaced uprights 2, 3 and 4 connected longitudinally adjacent their lower ends by pairs of spaced horizontal beams 5 and 6. The beams 5 preferably support a transversely arranged partition 7 for supporting suitable quantities of eggs to be washed and/or baskets to be employed for collecting the eggs. The beams 6 preferably support a transverse partition 8 to which, in turn, is secured a motor 9, as at 10. The motor is preferably connected through a suitable speed reduction device 11 with a pulley 12 having a belt 13 or the like thereon for transferring power from the motor to another pulley 14 that is fixed to a shaft 15, Fig. 4.

The shaft 15 is rotatably mounted transversely of the machine in a bearing aperture of a tank 16 that is supported by the pairs of uprights 2, 3 and 4 and longitudinally arranged side members 17 and 18 that connect the upper ends of the uprights. The shaft 15 also passes through and seats substantially at its opposite ends in bearing openings 19 and 20 in longitudinally arranged side sills 21 and 22 that may be suitably secured to the uprights adjacent their upper ends.

Suitable end members 23 and 24 complete the general structure of the machine frame and are arranged to aid in supporting the tank 16 on the frame.

The tank 16 is preferably provided with a step 25 approximately midway its length to form a bottom wall or level 26 on which rest the bottom edges of the sills 21 and 22. The difference in bottom levels or planes of the tank provides sufficient space 27 below the ends of the sills to position a basket 28 or the like to collect eggs 29 or the like.

A shaft 30 is preferably rotatably mounted in and transversely of the sills 21 and 22 at the ends thereof opposite the pulley 14, the shafts preferably being horizontally aligned and having rollers 31 and 32 thereon respectively for a supporting a conveyor 33 that is preferably formed of canvas or the like. The diameter of the rollers together with the distance between their centers and the length of the canvas are such that the roller 32 is arranged above the space 27 in the tank 16; the lower run of the conveyor is arranged above the level 26 of the tank; and the upper run of the conveyor is arranged below the upper edges of the tank.

Suitable fluid 34, such as water and preferably a one-half of one per cent solution of lye water, may thus be applied to the tank to a level covering the upper run of the conveyor to the end that the inherent buoyancy of eggs in the fluid may be taken advantage of in preventing cracking or checking of eggs and/or in preventing further damage to eggs that have already been checked but not badly broken.

It has also been found preferable to support the upper run of the conveyor on a transverse partition 35, opposite side edges of which are preferably suitably secured to the sills 21 and 22 at a position between the conveyor runs and adjacent the plane of the upper run. The weight of the eggs on the conveyor thus does not materially alter the plane of the upper run of the conveyor.

Mounted in the main frame above the conveyor is another frame 36 that preferably consists of side members 37 and 38 fitting within the sills 21 and 22, and end members 39 and 40 that connect the side members. Guide rails 41, 42, 43, 44 and 45, which may vary in number in accordance with the length of the frame, are mounted on the side members 37 and 38 preferably at approximately forty-five degree angles to each other and to the side members. The guide rail 41 preferably initiates at the juncture of the side member 38 and end member 39 and is provided with a cut-out portion 46 at its other end, the upper outer bounding edge of which rests on the side member 37 in longitudinally spaced relation to the end member 39. An entrance trough 47 is thus provided for the reception of eggs to be washed by the machine.

The inner surfaces of the end and side members of the frame 36, together with the opposite faces of the guide rails, are preferably padded, as with felt strips 48, to protect the eggs as they pass along the frame under movement of the conveyor.

The guide rail 42 is arranged in substantially opposite relation to the rail 41 and has a cut-out portion 49 at its end opposite the cut out portion of the rail 41. The other rails are preferably similarly arranged diagonally and angularly relative to the frame 36 and also have cut out portions to allow the eggs to follow a tortuous course along the frame. The movement of the conveyor, which is toward the end 40 of the frame 36 tends to hold the eggs against the sides of the guide rails that are to the left of the frame as in Fig. 1 and the eggs are caused to roll and impinge against the felt pads or buffers to appreciably clean or wash or scrub the eggs. As the eggs reach the cut out end of the last guide rail 45, they pass off the end of the conveyor and gravitate slowly, due to their buoyancy, into the basket 28 for collection.

In order to more thoroughly clean or wash the eggs, brushes 50, Fig. 6, are preferably provided for each guide rail. The brushes are preferably mounted on shafts 51 driven by motors 52 that are supported as by a plate 53 hinged to a support 54 secured to the upper edges of the guide rails, as at 55. In order to prevent crushing the eggs, the brushes are preferably balanced by a weight 56 or the like suitably secured to the motors.

The brushes 50 are preferably arranged on the side of the guide rails against which the eggs impinge and are spaced therefrom a distance sufficient for passing the eggs between the brushes and rails and at the same time contacting the eggs to brush the same.

It has been found that the rails retard movement of the eggs along the frame and the conveyor thus imparts a spiral movement to the eggs. The brushes preferably rotate in a direction opposed to movement of the eggs and a thorough scrubbing action is thus effected.

As a matter of practice it is preferable to arrange the brushes on the rails in the manner shown in Fig. 1; that is to say brushes 56 and 57 on the rails 42 and 44 are arranged at one side of the frame and preferably rotate in an anti-clockwise direction. The brushes 50, 59 and 60 are arranged on the rails 41, 43 and 45 adjacent the other side of the frame and rotate in a clockwise direction.

When the basket 28 has been filled, it may be removed from the space 27 below the discharge end of the conveyor and placed on a drainage device 61 that may be suitably secured to an end of the machine and which is preferably inclined toward the tank to transfer washing medium from the eggs back to the tank.

When dry or drained, the eggs may be crated and/or stored for use or suitable disposition.

In operating an egg washing machine constructed as described, the tank is preferably filled with a one-half of one per cent solution of lye water to a height above the upper run of the conveyor. The motor 9 for the conveyor and the brush motors are energized and eggs are applied to the entrance trough 47 at the feed end of the machine. The eggs travel a tortuous course throughout the length of the frame 36 meanwhile being spun by the conveyor as they are retarded by the guide rails. The brushes scrub the eggs during such movements and remove all soilage therefrom. The buoyancy of the eggs in the water above the conveyor aids in preventing their breakage.

As the eggs reach the discharge end of the conveyor they gravitate slowly into a basket provided to collect the eggs, and when the basket is filled, the eggs are drained of the water collecting on their surfaces, after which the eggs may be packed, crated, stored or otherwise suitably disposed of.

It is apparent therefore that I have provided an egg washing machine that is convenient, relatively economical and highly efficient; that obviates a great deal of breakage; and that makes eggs more readily saleable and enhances the price that may be asked for the eggs.

What I claim and desire to secure by Letters Patent is:

1. In a machine of the character described, a receptacle adapted to contain a fluid washing medium, a belt type conveyor having an upper run substantially horizontally arranged within the washing medium, guide rails arranged angularly relative to the longitudinal axis of the conveyor above the same and having openings therethrough, said guide rails being engageable with articles carried on the conveyor, brushes arranged adjacent to and cooperative with the rail to engage objects on the conveyor and brush the same, means for yieldingly mounting the brushes for movement laterally of the rails, and means for balancing the brushes on the yielding mounting means whereby the object effects said lateral movement of said brushes to prevent damage to the objects.

2. In a machine of the character described, a receptacle adapted to contain a fluid washing medium, means for moving eggs and like objects through said medium to wash the same, partitions normally retarding movement of the objects through the receptacle, means for brushing said objects during movement thereof, and means for yieldingly mounting said brushing means and allowing lateral movement thereof away from said partitions to prevent damage to said objects during travel thereof through said receptacle.

3. In a machine of the character described, a receptacle adapted to contain a fluid washing medium, a belt type conveyor having a run substantially horizontally arranged within the washing medium, spaced guide rails arranged angularly relative to the longitudinal axis of the conveyor above and longitudinally of the same and having openings therethrough at ends thereof for allowing objects on the conveyor to pass from one to another of the guide rails, said guide rails being engageable with articles carried on the conveyor, brushes engageable with objects on the conveyor to brush the same as they pass along the receptacle, and means for pivotally mounting said brushes on the rails for pivotal movement of said brushes away from the rails to prevent damage to said objects.

4. In a machine of the character described, a receptacle, a belt type conveyor having an upper run substantially horizontally arranged and movable in said receptacle, means for actuating said conveyor for moving eggs and like objects through said receptacle to clean said objects, spaced partitions arranged angularly relative to the longitudinal axis of the conveyor for engaging objects carried on the conveyor and normally retarding movement of the objects through the receptacle, means for brushing said objects during movement thereof, and means for yieldingly mounting said brushing means on the partitions and allowing lateral movement thereof away from said partitions to prevent damage to said objects during travel thereof through said receptacle.

5. In a machine of the character described, a stationary brush, a rotary brush spaced laterally from the stationary brush, means for pivotally mounting the rotary brush for pivotal movement away from the stationary brush, a belt type conveyor having an upper run arranged substantially horizontally, and guide means arranged angularly relative to the horizontal axis of the conveyor and positioned to engage objects carried thereon for moving objects on the conveyor angularly and transversely of the conveyor for effecting passage of said objects between the brushes to clean said objects, said rotary brush being moved laterally of the stationary brush to adjust the spacing between the brushes to pass objects of various sizes.

LEE E. MEAGHER.